United States Patent
Yang (10) Patent No.: US 9,019,852 B2
(45) Date of Patent: Apr. 28, 2015

(54) METHOD AND DEVICE FOR ADJUSTING SERVICE PROCESSING RESOURCES OF A MULTI-MODE BASE STATION SYSTEM

(75) Inventor: Shengqiang Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 237 days.

(21) Appl. No.: 13/553,226

(22) Filed: Jul. 19, 2012

(65) Prior Publication Data

US 2012/0281587 A1    Nov. 8, 2012

Related U.S. Application Data

(63) Continuation of application No. PCT/CN2011/070381, filed on Jan. 19, 2011.

(30) Foreign Application Priority Data

Jan. 20, 2010 (CN) .......................... 2010 1 0003455

(51) Int. Cl.
*H04W 16/04* (2009.01)
*H04W 24/02* (2009.01)
*H04W 88/10* (2009.01)
*H04W 24/08* (2009.01)

(52) U.S. Cl.
CPC .............. *H04W 16/04* (2013.01); *H04W 88/10* (2013.01); *H04W 24/02* (2013.01); *H04W 24/08* (2013.01)

(58) Field of Classification Search
CPC combination set(s) only.
See application file for complete search history.

(56) References Cited

U.S. PATENT DOCUMENTS

| | | | |
|---|---|---|---|
| 2006/0229079 A1* | 10/2006 | Cheng et al. .................. | 455/450 |
| 2006/0252450 A1* | 11/2006 | Wigard et al. ................ | 455/522 |
| 2008/0242332 A1* | 10/2008 | Suh et al. ...................... | 455/517 |
| 2009/0135812 A1 | 5/2009 | Wang et al. | |
| 2009/0225689 A1* | 9/2009 | Yu .............................. | 370/310.2 |
| 2009/0227262 A1 | 9/2009 | Gao | |
| 2010/0279622 A1* | 11/2010 | Shuman et al. ............ | 455/67.11 |

FOREIGN PATENT DOCUMENTS

| | | |
|---|---|---|
| CN | 101022479 | 8/2007 |
| CN | 101192948 | 6/2008 |

(Continued)

OTHER PUBLICATIONS

Extended European Search Report, dated Mar. 7, 2013, in corresponding European Application No. 11734367.3 (6 pp.).

(Continued)

*Primary Examiner* — Ian N Moore
*Assistant Examiner* — Eric H Wang
(74) *Attorney, Agent, or Firm* — Staas & Halsey LLP (57) ABSTRACT

A method and a device for adjusting service processing resources of a multi-mode base station system are provided, which relate to the wireless communication technology, so as to reduce the operation difficulty and the maintenance cost of the multi-mode base station system. The method includes: periodically acquiring traffic model data of each wireless access standard of the multi-mode base station system; determining service processing resources required by each wireless access standard according to the traffic model data; and adjusting service processing resources of each wireless access standard according to the determined service processing resources required by each wireless access standard. The device and method are mainly used in the multi-mode base station system.

15 Claims, 5 Drawing Sheets

(56) References Cited

FOREIGN PATENT DOCUMENTS

| | | |
|---|---|---|
| CN | 101193402 | 6/2008 |
| CN | 101202975 | 6/2008 |
| CN | 101217719 | 7/2008 |
| CN | 101247256 | 8/2008 |
| CN | 101567833 | 10/2009 |
| CN | 101754386 | 6/2010 |
| CN | 101754386 | 4/2012 |
| WO | 2008/061469 | 5/2008 |

OTHER PUBLICATIONS

International Search Report issued Apr. 28, 2011 in corresponding International Patent Application No. PCT/CN2011/070381.

Written Opinion of the International Searching Authority issued Apr. 28, 2011 in corresponding International Patent Application No. PCT/CN2011/070381.

International Search Report of PCT/CN/2011/070381 mailed Apr. 28, 2011.

* cited by examiner

METHOD AND DEVICE FOR ADJUSTING SERVICE PROCESSING RESOURCES OF A MULTI-MODE BASE STATION SYSTEM

CROSS-REFERENCE TO RELATED APPLICATIONS

This application is a continuation of International Application No. PCT/CN2011/070381, filed on Jan. 19, 2011, which claims priority to Chinese Patent Application No. 201010003455.0, filed on Jan. 20, 2010, both of which are hereby incorporated by reference in their entireties.

TECHNICAL FIELD

The present invention relates to the wireless communication technology, in particular to a method and a device for adjusting service processing resources of a multi-mode base station system.

BACKGROUND

The continuous development of the wireless communication technology enables the wide application of a multi-mode base station system capable of supporting multiple wireless access technologies.

Due to various wireless access technologies, such as 2nd Generation (2G) Global System for Mobile Communications (GSM), 3rd Generation (3G) Wideband Code Division Multiple Access (WCDMA), major differences exist in encoding/decoding technologies and modulating/demodulating technologies of service signals. Formerly dedicated networks were used and various wireless networks utilizing different wireless access technologies used dedicated hardware and chips for the processing of a single kind of wireless access technology. However, gradually this mode becomes unable to meet the development requirements of the multi-mode base stations. With the development of software radio technologies, using a generic hardware chip platform and implementing various wireless access technologies by software gradually becomes the mainstream. The digital signal processing (DSP) and the Field-Programmable Gate array (FPGA) are the generic programmable hardware chip platforms most commonly used in the field of software radio at present, and the technologies such as DSP, modulating/demodulating relevant to the various wireless access technologies can be implemented by software. Currently, on the practically built multi-mode base station system, all processing steps, from voice encoding/decoding, radio frame processing, radio baseband processing, modulating/demodulating to frequency conversion, are implemented by software with the DSP and the FPGA being used as generic hardware chip platforms. Therefore, current multi-mode base station systems can load different software through the generic hardware chips such as the DSP and the FPGA, so different wireless access technologies can be supported.

Since there are major differences among the logic software for each wireless access technology, in the planning and constructing of the current multi-mode base stations, service processing resources required by each wireless access technology are respectively computed according to the number of the subscribers and the traffic models estimated during the network planning, and then the service processing resources required by these wireless access technologies are fixedly allocated in the multi-mode base station system.

The inventor finds that at least the following problems exist in the prior art.

The 2G GSM technology and the 3G WCDMA technology are taken as examples. With the gradually increasing application of the 3G WCDMA technology, the subscribers of 2G GSM gradually phase out the obsolete 2G GSM mobile phones. Though the total number of users covered by the multi-mode base station system remains unchanged, the number of the subscribers of 3G WCDMA increases, whereas the number of the subscribers of the 2G GSM decreases. As such, according to the current mode of the multi-mode base station system allocating service processing resources for the 2G GSM technology and the 3G WCDMA technology, when the service processing resources required by the 3G WCDMA technology increase, the multi-mode base station system cannot re-allocate service processing resources for the 3G WCDMA technology. That is, when the service processing resources required by a certain wireless access technology change, according to the current resource allocation mode, the multi-mode base station system cannot dynamically adjust the service processing resources according to the demand of the wireless access technology. This causes the problem of difficulties in the coordination between user number allocation and network maintenance during the operation of the multi-mode base station system, thereby increasing the operation difficulty and the maintenance cost of the multi-mode base station system.

SUMMARY OF THE INVENTION

Embodiments of the present invention provide a method and a device for adjusting service processing resources of a multi-mode base station system, so as to reduce the operation difficulty and the maintenance cost of the multi-mode base station system.

Embodiments of the present invention adopt the following technical solutions.

A method for adjusting service processing resources of a multi-mode base station system, which includes:
periodically acquiring traffic model data of each wireless access standard of the multi-mode base station system;
determining service processing resources required by each wireless access standard based on the traffic model data; and
adjusting service processing resources of each wireless access standard according to the determined service processing resources required by each wireless access standard.

A device for adjusting service processing resources of a multi-mode base station system, which includes:
a data acquisition unit, configured to periodically acquire traffic model data of each wireless access standard of the multi-mode base station system;
a resource computation unit, configured to determine service processing resources required by each wireless access standard based on the traffic model data; and
a resource adjustment unit, configured to adjust service processing resources of each wireless access standard according to the determined service processing resources required by each wireless access standard.

The method and device for adjusting the service processing resources of the multi-mode base station system according to the embodiments of the present invention determine the service processing resources required by each wireless access standard through the periodically acquired traffic model data of each wireless access standard, and adjust the service processing resources of each wireless access standard. As can be seen from above, by making use of the embodiments of the present invention, the drawback in the prior art of being unable to automatically allocate service processing resources for a wireless access standard short of service processing resource during the operation of the system can be avoided. In addition, corresponding service processing resources can be allocated to each wireless access standard according to the demand for the service processing resources of each wireless access standard. Therefore, the operation difficulty and the maintenance cost of the multi-mode base station system are reduced by utilizing the technical solutions according to the embodiments of the present invention.

DESCRIPTION OF THE FIGURES

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

SPECIFIC EMBODIMENTS

The technical solution of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
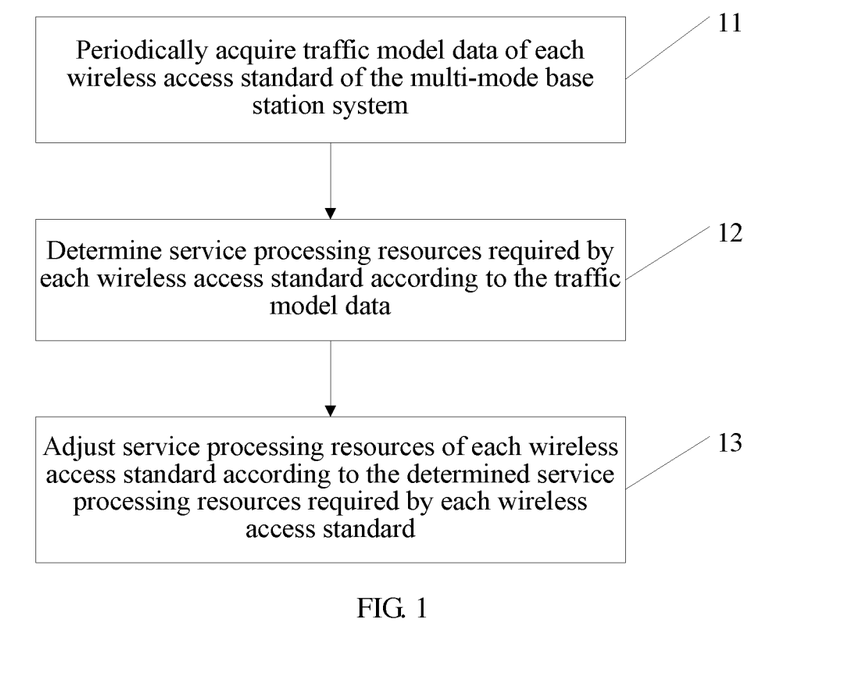
FIG. 1 is a flow chart of a method for adjusting service processing resources of a multi-mode base station system according to Embodiment 1 of the present invention.

To solve the problem in the prior art that the multi-mode base station system is unable to dynamically adjust the service processing resources to reduce the operation difficulty and the maintenance cost of the multi-mode base station system, Embodiment 1 of the present invention provides a method for adjusting service processing resources of a multi-mode base station system. As shown in FIG. 1, the method according to Embodiment 1 of the present invention includes the following steps.

Step 11: Periodically acquire traffic model data of each wireless access standard of the multi-mode base station system.

Each wireless access standard of the multi-mode base station system may include 2G GSM, 3G WCDMA, Code Division Multiple Access (CDMA), Worldwide Interoperability for Microwave Access (WiMax), or Long Term Evolution (LTE).

The unit of the period may be minute, hour, day, week, and month. Generally, it is recommended to choose the day as a unit for the acquisition. The objects to be acquired are classified according to the wireless access standard, and are acquired according to classifications of the wireless access standards of the accessed services. The points of acquisition may include various service processing resources through which the wireless signals pass in the multi-mode base station system, such as voice encoding/decoding, radio frame processing, radio baseband processing, modulation/demodulation, and frequency conversion implemented by a generic programmable hardware chip using software. The traffic model data includes, but is not limited to, the number of subscribers, Busy Hour Call Attempts (BHCA), erlang, and a call success rate/call failure rate.

For example, during the acquisition of the number of subscribers, to avoid repeated acquisition, a subscriber identifier of a would-be subscriber, such as a mapping relationship between an international mobile subscriber identity (IMSI) or an Electronic Serial Number (ESN) and the type of a wireless access standard, may be stored into the storage region of the multi-mode base station system.

Before the acquisition of the number of subscribers, the subscriber identifier of an access subscriber is acquired first, and the storage region is then searched according to the subscriber identifier. When the storage region does not store the subscriber identifier, which indicates that the access subscriber is a new subscriber, the subscriber identifier of the access subscriber and the type of the corresponding wireless access standard are stored in the storage region, and the number of subscribers under the corresponding wireless access standard is increased by one. When the storage region stores the subscriber identifier of the access subscriber, which indicates that the access subscriber is an old subscriber, then the type of the wireless access standard stored for the access subscriber is acquired according to the mapping relationship between the stored subscriber identifier and the type of the wireless access standard, and it is determined whether the type of the wireless access standard stored for the access subscriber is consistent with the type of the current wireless access standard of the subscriber. If the types are consistent, which indicates that the access subscriber has been acquired, then the acquisition is not repeated. If the stored type of the wireless access standard is not consistent with the type of the current wireless access standard of the access subscriber, which indicates that the access subscriber may have changed the type of the wireless terminal but may have not changed the Subscriber Identity Module (SIM) card or the User Identity Model (UIM) card, then the number of subscribers corresponding to the wireless access standard stored for the access subscriber is decreased by one, the type of the wireless access standard stored for the access subscriber is updated as the type of the current wireless access standard of the access subscriber, and the number of subscribers under the type of the current wireless access standard of the access subscriber is increased by one.

In addition, when a subscriber does not access a multi-mode base station system within a specified time period (for example, a subscriber does not send any messages to the multi-mode base station system within a day), the stored information of the subscriber may be deleted and the number of subscribers under the wireless access standard corresponding to the subscriber is decreased by one.

Step 12: Determine service processing resources required by each wireless access standard according to the traffic model data.

In accordance with the embodiments of the present invention, how to determine the service processing resources required by each wireless access standard can be expressed as a mathematical model function, the input of which is the traffic model data $[A_i]$, $A_i=(a_{ij})$, the output of which is a reference value, represented as $B_i$. The above mathematic model can be expressed as:

$$B_i=\text{Function}[A_i] \quad (1)$$

where $A_i$ represents the ensemble of the traffic model data of the $i^{th}$ wireless access standard as acquired, and $a_{ij}$ represents the jth data item in the traffic model data of the $i^{th}$ wireless access standard as acquired.

In different application contexts, the reference value $B_i$ has different meanings. Further, the service processing resources required by each wireless access standard can be determined by coarse tuning, fine tuning or a combination of coarse tuning and fine tuning using $B_i$ as a reference.

For example, in the coarse tuning mode, $B_i$ represents a ratio of the service processing resource allocated to the $i^{th}$ wireless access standard to the total service processing resources of the system. Thus, the service processing resources required by each wireless access standard can be determined from the service processing resources of the multi-mode base station system according to the ratio $B_i$.

In another example, in the fine tuning mode, $B_i$ represents the step size for adjusting service processing resources of the $i^{th}$ wireless access standard. Here, the step size for adjusting the service processing resources $B_i$ is limited to the three values 0, +1, −1, which indicates that at most one service processing resource is adjusted in each adjustment. In fact, it can be defined as other values. Thus, in determining the service processing resources required by each wireless access standard, the service processing resources of each wireless access standard can be determined according to the step size for adjusting resources.

In still another example, in the combined mode of coarse tuning and fine tuning, service processing resources may first be allocated according to a ratio in the coarse tuning mode, to coarsely tune all service processing resources in the system. Then, the service processing resources of each wireless access standard may be fine tuned according to the step size for adjustment in the fine tuning mode.

Of course, in practice, the manners of determining the service processing resources required by each wireless access standard are not limited to the ones as set forth herein.

Step 13: Adjust service processing resources of each wireless access standard according to the determined service processing resources required by each wireless access standard.

After determining the service processing resources needed to be allocated to each wireless access standard, the resources can be adjusted in the following modes.

In adjustment mode 1, all service processing resources to be allocated in the system are classified according to the determined amount of service processing resources required by each wireless access standard, and the wireless access standards of the service processing resources which are needed to be re-allocated are modified to the newly allocated wireless access standards.

It is assumed that the system has 10000 service processing resources in total, the number of subscribes under the original 2G GSM standard is 5000, the number of subscribers under the 3G WCDMA standard is 5000, whereas the acquired number of subscribers required by the current 2G GSM standard is 4000, and the number of subscribers required by the 3G WCDMA standard is 6000. Then, during the adjustment, 4000 service processing resources may be re-allocated to the 2G GSM standard from the 10000 service processing resources, and 6000 service processing resources may be allocated to the 3G WCDMA mode. In addition, the mode of the re-allocated 4000 service processing resources is modified to the 2G GSM standard, and the mode of the re-allocated 6000 service processing resources is modified to the 3G WCDMA standard.

In adjustment mode 2, to mitigate the influence of the adjustment on the whole system, during the adjustment, it is possible to adjust only those service processing resources that need to be altered. That is, the corresponding service processing resources can be adjusted based on the current service processing resources of each wireless access standard. The specific ways can be, allocating, by the system, service processing resources for each wireless access standard; adjusting redundant service processing resources in the current service processing resources of the wireless access standard when the amount of the current service processing resources of the wireless access standard is greater than the amount of the allocated service processing resources; allocating corresponding service processing resources based on the current service processing resources of each wireless access standard when the amount of the current service processing resources of the wireless access standard is smaller than the amount of the allocated service processing resources, such that the amount of the service processing resources of the wireless access standard is equal to the amount of the allocated service processing resources. If the amount of the current service processing resources of the wireless access standard is equal to the amount of the allocated service processing resources, the adjustment becomes unnecessary.

For example, it is assumed that the system has 100 service processing resources, in which 70% are service processing resources of the 2G GSM standard, and 30% are the service processing resources of the 3G WCDMA standard. After computation, it is known that currently 50% of the service processing resources are required by the 2G GSM standard and 50% of the service processing resources are required by the 3G WCDMA standard. Then, during the adjustment, it is only necessary to change 20 service processing resources of the 2G GSM standard to the service processing resources of the 3G WCDMA standard. Therefore, during the resource allocation, it is only necessary to arbitrarily choose 20 service processing resources of the 2G GSM standard for change, re-load software to change the service processing resources into the service processing resources of the 3G WCDMA standard, and keep other service processing resources unchanged.

One of the algorithms is described as follows. First, perform a poll and compare one by one the amount of new service processing resources of each wireless access standard with the original amount of the service processing resources. If the amount of the new service processing resources is smaller than the original amount of the service processing resources, the service processing resources of the $i^{th}$ wireless access standard release (the original amount of the service processing resources—the amount of the new service processing resources) of service processing resources into an idle service processing resource pool. Perform another poll and compare one by one the amount of the new service processing resources of each wireless access standard with the original amount of the service processing resources. If the amount of the new service processing resources is greater than the original amount of the service processing resources, the service processing resources of the $i^{th}$ wireless access standard need to be increased by (the amount of the new service processing resources—the original amount of the service processing resources) of the service processing resources. Thus, (the amount of the new service processing resources—the original amount of the service processing resources) of the service processing resources are arbitrarily taken from the idle service processing resource pool and configured as the service processing resources of the $i^{th}$ wireless access standard. After two rounds of polling and traversal, the configuration and adjustment of the service processing resources for all the wireless access standards are completed.

After the service processing resources are configured and adjusted, the system automatically triggers the reset of the service processing resources and loads corresponding software for the configured various service processing resources. Thus, the service processing resources become service processing resources of the corresponding wireless access standards, so the service processing resources of each wireless access standard are effective in the multi-mode base station system. In particular, the reset is not triggered for those service processing resources for which the wireless access standard configurations are not adjusted, ensuring minimum influences on the system.

It can be seen from the above description that in the method for adjusting the service processing resources of the multi-mode base station system provided in Embodiment 1 of the present invention, the service processing resources required by each wireless access standard are determined through the periodically acquired traffic model data of each wireless access standard, and the service processing resources for each wireless access standard are adjusted. It can be seen from above that, with the use of the embodiment of the present invention, the drawback in the prior art of being unable to automatically allocating service processing resources for a wireless access standard short of service processing resources during the operation of the system can be avoided, and also the corresponding service processing resources can be allocated to each wireless access standard according to the demand of each wireless access standard for service processing resources. Thus, by utilizing the technical solution in the embodiment of the present invention, the operation difficulty and the maintenance cost of the multi-mode base station system are reduced.

In the following, how to determine the service processing resources required by each wireless access standard in different manners is respectively described with reference to Embodiments 2, 3 and 4.

Figure 2:
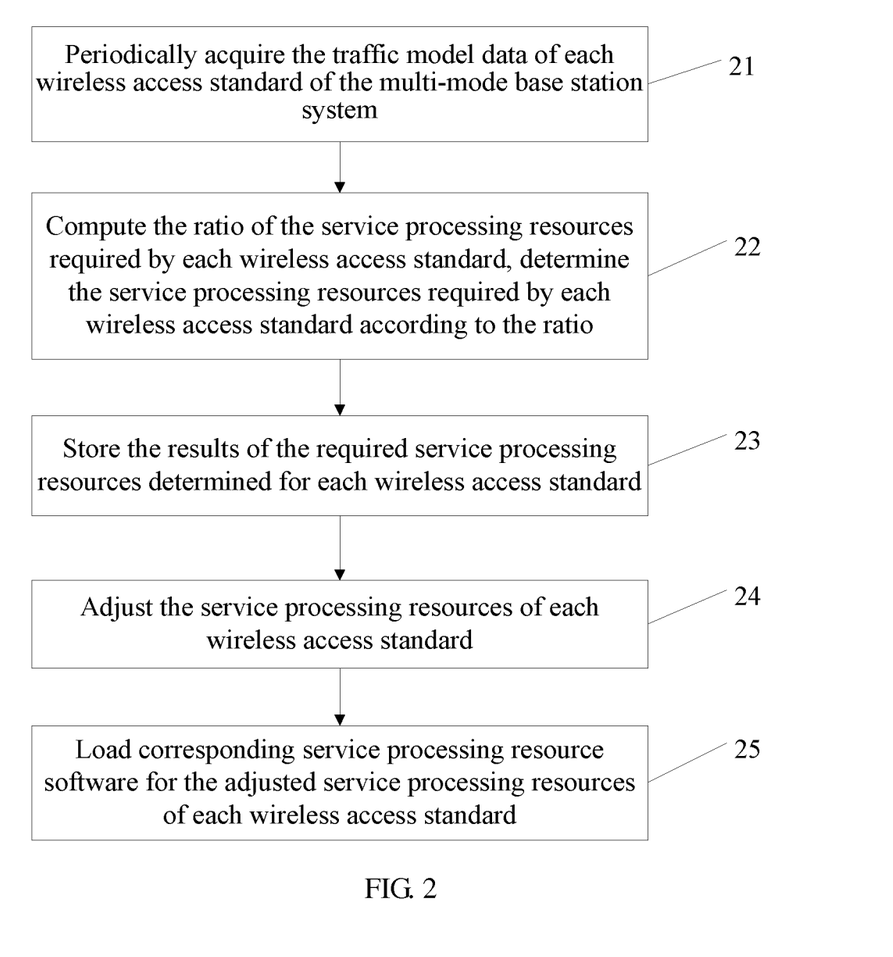
FIG. 2 is a flow chart of a method for adjusting service processing resources of a multi-mode base station system according to Embodiment 2 of the present invention.

In Embodiment 2 of the present invention, a method for adjusting service processing resources of a multi-mode base station system is described by taking a coarse tuning mode as an example. As shown in FIG. 2, Embodiment 2 of the present invention includes the following steps.

Step 21: Periodically acquire the traffic model data of each wireless access standard of the multi-mode base station system.

The various ways of acquiring the traffic model data are the same as those described in Step 11.

Step 22: Compute the ratio of the service processing resources required by each wireless access standard, determine the service processing resources required by each wireless access standard from the service processing resources of the multi-mode base station system according to the ratio.

In this way, the above formula (1) can be specifically expressed as:

$$B_i = \text{Function}[A_i] \text{ and } \sum_{i=1}^{n} B_i = 1 \quad (2)$$

where $B_i$ represents the ratio of the service processing resources allocated to the $i^{th}$ wireless access standard to the total amount of the service processing resources of the system.

In accordance with the above formula (2), for example, it is assumed that only the acquisition index of the number of subscribers is considered and other data is neglected, and it is assumed that $a_{i0}$ represents the acquired acquisition index of the number of subscribers in the traffic model data of the $i^{th}$ wireless access standard, so the total number of the subscribers is $$T = \sum_{i=1}^{n} a_{i0}.$$

In accordance with the ratio allocation schemes of the number of subscribers for each wireless access standard, $$B_i = \frac{a_{i0}}{T}.$$

This is applicable to the allocation of various service processing resources.

For example, it is assumed that only erlang acquisition index in the traffic model data is considered and other data is neglected, and it is assumed that $a_{i1}$ represents the acquired erlang acquisition index in the traffic model data of the $i^{th}$ wireless access standard, so the total erlang of the system is $$T = \sum_{i=1}^{n} a_{i1}.$$

In accordance with the ratio allocation schemes of erlang for each wireless access standard, $$B_i = \frac{a_{i1}}{T}.$$

This is applicable to the allocation of service processing resources of the service plane.

In another example, it is assumed that only BHCA acquisition index in the traffic model data is considered, and it is assumed that $a_{i2}$ represents the acquired BHCA acquisition index in the traffic model data of the $i^{th}$ wireless access standard, so the total BHCA of the system is $$T = \sum_{i=1}^{n} a_{i2}.$$

In accordance with the ratio allocation schemes of the BHCA for each wireless access standard, $$B_i = \frac{a_{i2}}{T}.$$

This is applicable to the allocation of the service processing resources of the control plane.

Thus, in this embodiment, the service processing resources required by each wireless access standard are allocated according to the value of $B_i$. It is assumed that the total amount of certain service processing resources of a multi-mode base station is Z, so the amount of the service processing resources allocated to the $i^{th}$ wireless access standard is $R_i = |Z \times B_i|$, and |.| represents the operation of rounding to an integer.

For example, it is assumed that the system has 10000 service processing resources in total, the acquired number of the subscribers of the 2G GSM standard is 4000, and the number of the subscribers of the 3G WCDMA standard is 4000, so the allocation is performed according to the ratio concerning the number of the subscribers. The ratio of the amount of the service processing resources required by the 2G GSM standard to that for the 3G WCDMA standard is 1:1, and the amounts of service processing resources eventually allocated to the 2G GSM standard and the 3G WCDMA standard are 5000 and 5000, respectively.

Step 23: Store the results of the required service processing resources determined for each wireless access standard.

As such, during resource allocation each time, the demand of each wireless access standard for the service processing resources can be learned through the stored results, and the demand of the subscriber of each wireless access standard can be learned through the variations of the demand of the standard.

Step 24: Adjust the service processing resources of each wireless access standard according to the results of step 22.

In this embodiment, the way of adjusting can be referred to any one way of adjusting in step 13.

Step 25: Load corresponding service processing resource software for the adjusted service processing resources of each wireless access standard.

Similarly, during the adjustment using mode 1 in step 13, it is necessary to re-load service processing resource software for the service processing resources under each wireless access standard. However, when mode 2 is used, it is only necessary to load service processing resource software for the adjusted service processing resources.

Now, the software configuration process for the service processing resources required by each wireless access standard is completed.

It can be seen from above that the operation difficulty and the maintenance cost of the multi-mode base station system are reduced by utilizing the technical solution according to Embodiment 2 of the present invention.

Figure 3:
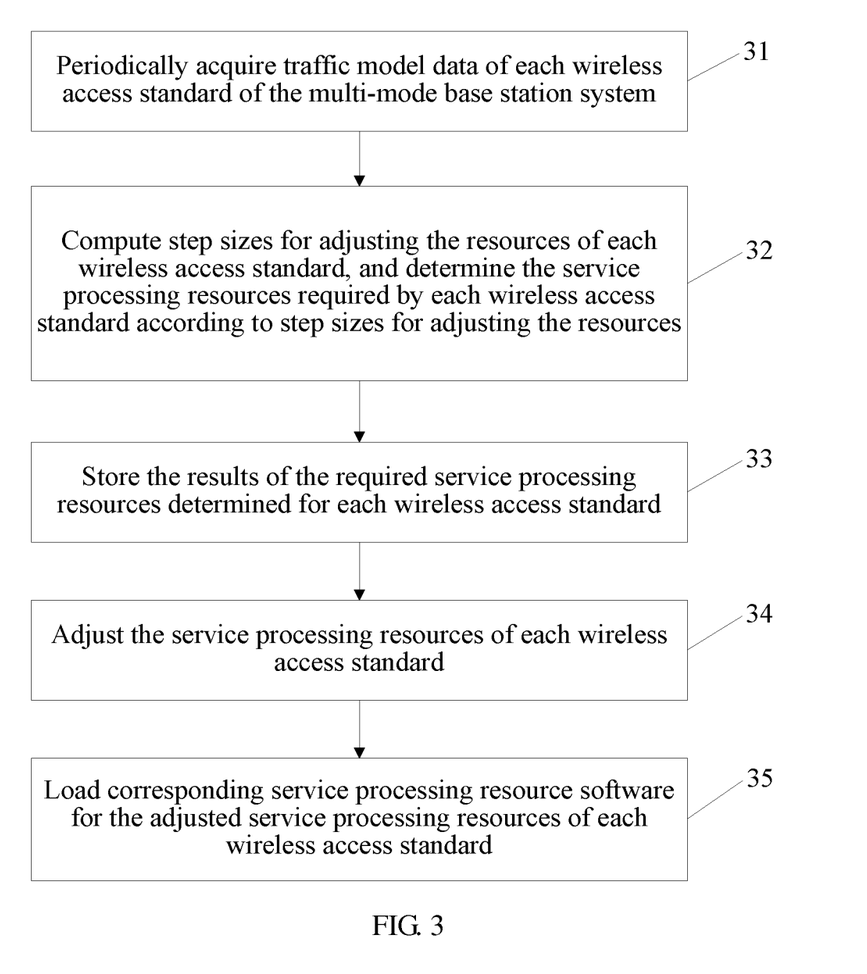
FIG. 3 is a flow chart of a method for adjusting service processing resources of a multi-mode base station system according to Embodiment 3 of the present invention.

In Embodiment 3 of the present invention, the method for adjusting service processing resources of the multi-mode base station system is described by taking a fine tuning mode as an example. As shown in FIG. 3, Embodiment 3 of the present invention includes the following steps.

Step 31: Periodically acquire traffic model data of each wireless access standard of the multi-mode base station system.

The various ways of acquiring traffic model data are the same as those as described in step 11.

Step 32: Compute step sizes for adjusting the resources of each wireless access standard, and determine the service processing resources required by each wireless access standard according to step sizes for adjusting the resources.

In this way, the above formula (1) can be specifically expressed as:

$B_i = \text{Function}[A_i]$, where $B_i$ can take three values 0, +1, −1, and $$\sum_{i=1}^{n} B_i = 0 \qquad (3)$$

where $B_i$ represents the step size for adjusting service processing resources of the $i^{th}$ wireless access standard, in which the step size for adjusting the resources is limited to the three values 0, +1, −1, which indicates that in each adjustment, at most one service processing resource is adjusted. In fact, the step size can also be defined as other values.

The restraints of the mathematical formula (3) require that the adjustments of increasing or decreasing the service processing resources required by each wireless access standard in the multi-mode base station system should be balanced.

For example, it is assumed that only the call failure rate acquisition index in the traffic model data is considered and other data is neglected, and it is assumed that $a_{i3}$ represents the acquired call failure rate acquisition index in the traffic model data of the $i^{th}$ wireless access standard. Two thresholds $W_0$ and $W_1$ are set in the multi-mode base station system, where $W_0 \leq W_1$. If $a_{i3} \geq W_1$, which indicates that the service processing resources allocated to the $i^{th}$ wireless access standard are relatively insufficient and a relatively high call failure rate is caused, then $B_i = +1$, and the service processing resources for the $i^{th}$ wireless access standard need to be increased. If $a_{i3} \leq W_0$, which indicates that the service processing resources allocated to the $i^{th}$ wireless access standard are relatively abundant and a relatively low call failure rate is caused, $B_i = -1$, and the service processing resources for the $i^{th}$ wireless access standard can be appropriately decreased. If $W_0 < a_{i3} < W_1$, which indicates that the service processing resources allocated to the ith wireless access standard are appropriate and an acceptable call failure rate is caused, $B_i = 0$, and the service processing resources for the $i^{th}$ wireless access standard does not requires to be increased or decreased. Specially, when $W_0 = W_1$, the third scenario does not occur.

One of the specific algorithms is implemented as follows: 1) Initialize all $B_3$ as zeros, sort all $a_{i3}$ from low to high; 2) take the smallest $a_{03}$, after the sorting, if $a_{03} \leq W_0$, the service processing resources for the corresponding wireless access standard is decreased by 1; if $a_{03} > W_0$, which indicates that for the wireless access standard with the smallest call failure rate, the system cannot spare extra service processing resources, terminate the algorithm; take the largest $a_{m3}$, after the sorting, if $a_{m3} \geq W_1$, the service processing resources for the corresponding wireless access standard is increased by 1; if $a_{m3} < W_1$, which indicates that for the wireless access standard with the largest call failure rate, it is not necessary to increase service processing resources, terminate the algorithm. 3) continue taking a second smallest $a_{13}$, and a second largest $a_{(m-1)3}$, for the same processing, to the extent that all data after the sorting are processed or the algorithm is terminated.

According to $B_i$, the amount of service processing resources allocated to the $i^{th}$ wireless access standard is: the amount of the new service processing resources $R_i$=the original amount of the service processing resources $R_i + B_i$.

Step 33: Store the results of the required service processing resources determined for each wireless access standard.

As such, during resource allocation each time, the demand of each wireless access standard for service processing resources can be learned through the stored results, and the demand of the subscriber of each wireless access standard can be learned through the variation of the demand of the standard.

Step 34: Adjust the service processing resources of each wireless access standard according to the results of step 32. In this embodiment, the way of adjusting can be referred to any one way of adjusting in step 13.

For example, after computation, if the failure rate of requesting call service processing resources for the 2G GSM standard is lower than the threshold $W_0$, whereas the failure rate of requesting call service processing resources for the 3G WCDMA standard is higher than the threshold $W_1$, and the success rate of requesting the call service processing resources for CDMA is within the range $[W_0, W_1]$, this indicates that the service processing resources for the 2G GSM may be reduced, the service processing resources for the 3G WCDMA need to be increased, and the service processing resources for the CDMA may be kept unchanged. Then, the system chooses a certain part of service processing resources of the 2G GSM standard, changes the service processing resources into the service processing resources for the 3G WCDMA standard, and re-loads the software for the 3G WCDMA standard. Thus, the service processing resources for the 3G WCDMA standard are increased and the shortage is partially compensated. If the service processing resources for the 3G WCDMA standard are still insufficient during the next resource adjustment, then adjustment and compensation continue to be performed.

Step 35: Load corresponding service processing resource software for the adjusted service processing resources of each wireless access standard.

Similarly, when the adjustment uses mode 1 in step 13, it is necessary to re-load the service processing resource software for the service processing resources under each wireless access standard. However, when mode 2 is used, it is only necessary to load the service processing resource software for the adjusted service processing resources. Generally, the service processing resource software is only loaded for those adjusted service processing resources when mode 2 in the fine-tuning mode.

Now, the software configuration process for the service processing resources required by each wireless access standard is completed.

It can be seen from the above that the operation difficulty and the maintenance cost of the multi-mode base station system are reduced by utilizing the technical solution according to Embodiment 3 of the present invention.

In Embodiment 4 of the present invention, the service processing resources required by each wireless access standard are determined by combining the coarse tuning mode and the fine tuning mode. When the coarse tuning mode and the fine tuning mode are combined, first, service processing resources are proportionally allocated according to the coarse tuning mode to coarsely tune all service processing resources within the system. Then, the service processing resources of each wireless access standard are fine tuned according to the step size for adjustment in the fine tuning mode.

Figure 4:
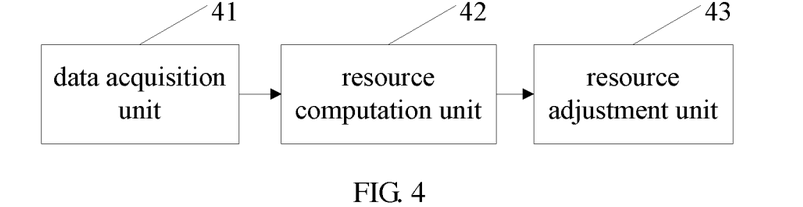
FIG. 4 is a schematic diagram of a device for adjusting service processing resources of a multi-mode base station system according to Embodiment 5 of the present invention.

Embodiment 5 of the present invention provides a device for adjusting service processing resources of a multi-mode base station system. As shown in FIG. 4, the device includes a data acquisition unit 41 configured to periodically acquire traffic model data of each wireless access standard of the multi-mode base station system; a resource computation unit 42 configured to determine service processing resources required by each wireless access standard according to the traffic model data; and a resource adjustment unit 43 configured to adjust service processing resources of each wireless access standard according to the determined service processing resources required by each wireless access standard.

Similar to the description in the method embodiments, the resource computation unit 42 can determine the amount of service processing resources required by each wireless access standard in different ways.

Figure 5:
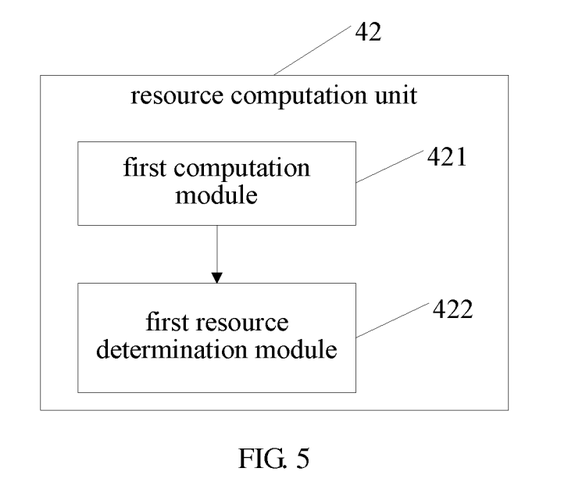
FIG. 5 is a first structure diagram of a resource computation unit according to Embodiment 5 of the present invention.

As shown in FIG. 5, the resource computation unit 42 may include a first computation module 421 configured to compute the ratio of the service processing resources required by each wireless access standard according to the traffic model data; and a first resource determination module 422 configured to determine the service processing resources required by each wireless access standard according to the ratio. At this time, the resource adjustment unit 43 may, according to the ratio, allocate service processing resources satisfying corresponding ratio for each wireless access standard from all service processing resources of the multi-mode base station system. Alternatively, at this time, the resource adjustment unit 43 may allocate corresponding service processing resources for each wireless access standard according to the ratio through the system, based on the current service processing resources of these standards. That is, when the amount of the current service processing resources of the wireless access standard is larger than the amount of the allocated service processing resources, the redundant service processing resources in the current service processing resources of the wireless access standard are adjusted. When the amount of the current service processing resources of the wireless access standard is smaller than the amount of the allocated service processing resources, the corresponding service processing resources are allocated based on the current service processing resources of the wireless access standard, such that the amount of the service processing resources of the wireless access standard is equal to the amount of the allocated service processing resources.

Figure 6:
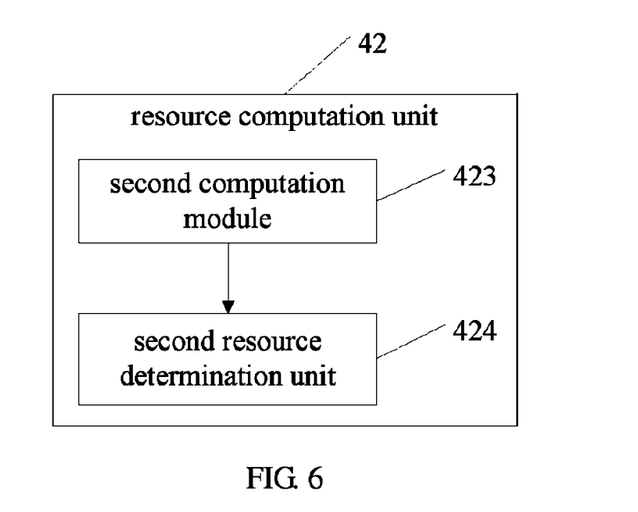
FIG. 6 is a second structure diagram of the resource computation unit according to Embodiment 5 of the present invention.

Alternatively, as shown in FIG. 6, the resource computation unit 42 may further include: a second computation module 423 configured to compute the step sizes for adjusting the resources of each wireless access standard; a second resource determination module 424 configured to determine the service processing resources required by each wireless access standard according to step sizes for adjusting the resources. At this time, the corresponding service processing resources may be re-allocated to each wireless access standard from all service processing resources of the system, according to step sizes for adjustment. Alternatively, at this time, the resource adjustment unit 43 may allocate corresponding service processing resources to each wireless access standard through the system, according to the step sizes, based on the current service processing resources of the wireless access standard. That is, when the amount of the current service processing resources of a wireless access standard is larger than the amount of the allocated service processing resources, the redundant service processing resources in the current service processing resources of the wireless access standard are adjusted. When the amount of the current service processing resources of the wireless access standard is smaller than the amount of the allocated service processing resources, corresponding service processing resources are allocated based on the current service processing resources of the wireless access standard, such that the amount of the service processing resources of the wireless access standard is equal to the amount of the allocated service processing resources.

It can be seen from the above description that, the device for adjusting service processing resources of the multi-mode base station system as provided in Embodiment 5 of the present invention, the service processing resources required by each wireless access standard are determined through the acquired traffic model data of each wireless access standard, and the corresponding service processing resources are allocated to each wireless access standard. This avoids the drawback in the prior art of being unable to automatically allocate and adjust the service processing resources for wireless access standard short of service processing resources during the operation of the system, and can allocate corresponding service processing resources to each wireless access standard according to the demand of each wireless access standard for service processing resources. Thus, with the use of the technical solution according to the embodiment of the present invention, the operation difficulty and the maintenance cost of the multi-mode base station system are reduced.

Figure 7:
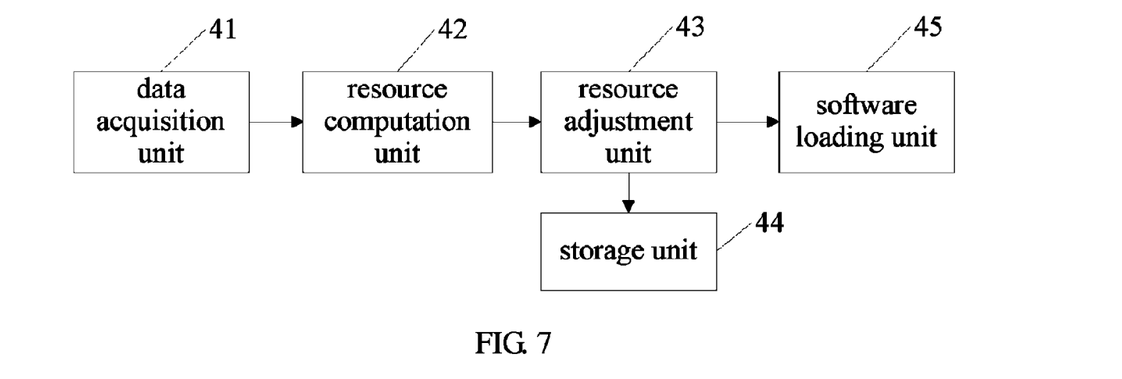
FIG. 7 is a schematic diagram of a device for adjusting service processing resources of a multi-mode base station system according to Embodiment 5 of the present invention.

Based on FIG. 4 or FIG. 5 or FIG. 6, as shown in FIG. 7, to learn the demand for service processing resources of each wireless access standard and learn the demands of the subscriber of each wireless access standard based on the variations of the demand, the device according to Embodiment 5 of the present invention further includes a storage unit 44 configured to store the determined results of the service processing resources required by each wireless access standard.

In addition, also as shown in FIG. 7, the device for adjusting the service processing resources of the multi-mode base station system may further include a software loading unit 45 configured to load corresponding service processing resource software for the adjusted service processing resources of each wireless access standard.

The units or modules related to the above embodiment may be implemented by either hardware or computer programs.

Now, the software configuration process for the service processing resources of each wireless access standard is completed.

In conclusion, the method and device for adjusting service processing resources of the multi-mode base station system set forth in the embodiments of the present invention enable the multi-mode base station system to automatically adapt to variations in the number of subscribers and traffic models of each wireless access standard, automatically adjust service processing resources of each wireless access standard, and reduce the operation difficulty and the maintenance cost of the system. Meanwhile, as the method and device set forth in the embodiments of the present invention can accurately allocate service processing resources to each wireless access standard based on the demand of each wireless access standard, the service processing resources of the system can be fully exploited, which always keeps the performance of the system in an optimal state.

The method and device according to the embodiments of the present invention are not only applicable to the multi-mode base station systems, but also can be used in any technologies in need of dynamic resource allocation.

Those of ordinary skill in the art should understand that all or a part of the processes of the method according to the embodiments of the present invention may be implemented by a computer program instructing relevant hardware. The program may be stored in a computer readable storage medium. When the program is run, the processes of the method according to the embodiments of the present invention are performed. The storage medium may be a Read-Only Memory (ROM), a Random Access Memory (RAM), a magnetic disk or an optical disk.

The above descriptions are merely specific embodiments of the present invention, but not intended to limit the scope of the present invention. Any variations or replacement that can be easily derived by those skilled in the art should fall within the scope of the present invention. Therefore, the protection scope of the present invention is subject to the appended claims.

The invention claimed is:

1. A method for adjusting service processing resources of a multi-mode base station system utilizing a plurality of wireless access standards, the method comprising:
   periodically acquiring respective traffic model data of two or more wireless access standards from among the plurality of wireless access standards of the multi-mode base station system and to store a mapping relationship between a subscriber identifier and a wireless access standard of the subscriber;
   determining service processing resources required by the two or more wireless access standards according to a demand for the two or more wireless access standards based upon the respective traffic model data for the two or more wireless access standards; and
   adjusting the service processing resources of the two or more wireless access standards based on the determined service processing resources required by the two or more wireless access standards,
   wherein service processing resource software corresponding to the adjusted service processing resources for the two or more wireless access standards are loaded,
   wherein the traffic model data comprises one or any combination of number of subscribers, busy hour call attempts, erlang, or a call success/failure rate and traffic model data for a repeated subscriber is not acquired according to the storing of the mapping relationship between the subscriber identifier and the wireless access standard of the subscriber,
   wherein the traffic model data of the two or more wireless access standards of the multi-mode base station system is periodically acquired by:
      acquiring the subscriber identifier of the subscriber;
      when the multi-mode base station system does not store the subscriber identifier, storing the identifier of the subscriber and a wireless access standard of the subscriber, and increasing number of subscribers under the wireless access standard corresponding to the subscriber by one; and
      when the multi-mode base station system stores the subscriber identifier, comparing a stored wireless access standard of the subscriber with a current wireless access standard of the subscriber, if the compared wireless access standards are not consistent with each other, decreasing number of subscribers under the wireless access standard corresponding to the subscriber by one, and increasing number of subscribers under the current wireless access standard corresponding to the subscriber by one, and updating the stored wireless access standard of the subscriber with the current access standard of the subscriber.

2. The method according to claim 1, wherein the determining the service processing resources of the two or more wireless access standards comprises:
   computing ratio of the service processing resources required by the two or more wireless access standards based on the traffic model data; and determining the service processing resources required by the two or more wireless access standards according to the ratio.

3. The method according to claim 1, wherein the determining the service processing resources required by the two or more wireless access standards comprises:
computing step size for adjusting the service processing resources of the two or more wireless access standards according to the traffic model data; and
determining the service processing resources required by the two or more wireless access standards based on the step size for adjusting the service processing resources.

4. The method according to claim 2, wherein the adjusting the service processing resources of the two or more wireless access standards according to the determined service processing resources required by the two or more wireless access standards comprises:
re-allocating corresponding service processing resources to the two or more wireless access standards from a number of service processing resources of the multi-mode base station system according to the ratio for adjusting the service processing resources; or
allocating corresponding service processing resources to the two or more wireless access standards through the multi-mode base station system according to the ratio for adjusting the service processing resources, based on current service processing resources of the two or more wireless access standards.

5. The method according to claim 3, wherein the adjusting the service processing resources of the two or more wireless access standards according to the determined service processing resources required by the two or more wireless access standards comprises:
re-allocating corresponding service processing resources to the two or more wireless access standard from a number of service processing resources of the multi-mode base station system according to the step size for adjusting the service processing resources; or
allocating corresponding service processing resources to the two or more wireless access standards through the multi-mode base station system according to the step size for adjusting the service processing resources, based on current service processing resources of the two or more wireless access standards.

6. The method according to claim 1, wherein after determining the service processing resources required by the two or more wireless access standards according to the traffic model data, the method further comprising:
storing results of needed service processing resources determined for the two or more wireless access standards.

7. A device for adjusting service processing resources of a multi-mode base station system utilizing a plurality of wireless access standards, the device comprising:
computer hardware with non-transitory computer readable storage medium which store instructions that when executed by the computer hardware implement units of:
a data acquisition unit to periodically acquire respective traffic model data of two or more wireless access standards from among the plurality of wireless access standards of the multi-mode base station system and to store a mapping relationship between a subscriber identifier and a wireless access standard of the subscriber;
a resource computation unit to determine service processing resources required by the two or more wireless access standards according to a demand for the two or more wireless access standards based upon the respective traffic model data for the two or more wireless access standards; and
a resource adjustment unit to adjust the service processing resources of the two or more wireless access standards based on the determined service processing resources required by the two or more wireless access standards,
wherein service processing resource software corresponding to the adjusted service processing resources for the two or more wireless access standards are loaded,
wherein the traffic model data comprises one or any combination of number of subscribers, busy hour call attempts, erlang, or a call success/failure rate, and traffic model data for a repeated subscriber is not acquired according to the storing of the mapping relationship between the subscriber identifier and the wireless access standard of the subscriber,
wherein the traffic model data of the two or more wireless access standards of the multi-mode base station system is periodically acquired by:
acquiring the subscriber identifier of the subscriber;
when the multi-mode base station system does not store the subscriber identifier, storing the identifier of the subscriber and the wireless access standard of the subscriber, and increasing number of subscribers under the wireless access standard corresponding to the subscriber by one; and
when the multi-mode base station system stores the subscriber identifier, comparing a stored wireless access standard of the subscriber with a current wireless access standard of the subscriber, if the compared wireless access standards are not consistent with each other, decreasing number of subscribers under the wireless access standard corresponding to the subscriber by one, and increasing number of subscribers under the current wireless access standard corresponding to the subscriber by one, and updating the stored wireless access standard of the subscriber with the current access standard of the subscriber.

8. The device according to claim 7, wherein the resource computation unit comprises:
a first computation module to compute ratio of the service processing resources required by the two or more wireless access standards based on the traffic model data; and
a first resource determination module to determine service processing resources required by the two or more wireless access standards according to the ratio.

9. The device according to claim 7, wherein the resource computation unit comprises:
a second computation module to compute step size for adjusting the service processing resources of the two or more wireless access standards based on the traffic model data; and
a second resource determination module to determine the service processing resources required by the two or more wireless access standards according to the step size for adjusting the service processing resources.

10. The device according to claim 8, wherein
the resource adjustment unit re-allocates corresponding service processing resources to the two or more wireless access standards from a number of service processing resources of the multi-mode base station system, based on the ratio for adjusting the service processing resources; or the resource adjustment unit allocates corresponding service processing resources to the two or more wireless access standards through the multi-mode base station system according to the ratio for adjusting the service processing resources, based on current service processing resources of the two or more wireless access standards.

11. The device according to claim 9, wherein
the resource adjustment unit re-allocates corresponding service processing resources to the two or more wireless access standards from a number of service processing resources of the multi-mode base station system, based on the step size for adjusting the service processing resources; or
the resource adjustment unit allocates corresponding service processing resources to the two or more wireless access standards through the multi-mode base station system according to the step size for adjusting the service processing resources, based on current service processing resources of the two or more wireless access standards.

12. The device according to claim 7, wherein the non-transitory computer readable storage medium stores required service processing resources determined for the two or more wireless access standards.

13. A computer program product comprising a computer readable non-transitory storage medium storing program code thereon for a multi-mode base station system utilizing a plurality of wireless access standards, the program code comprising:
instructions for periodically acquiring respective traffic model data of two or more wireless access standards from among the plurality of wireless access standards of the multi-mode base station system and to store a mapping relationship between a subscriber identifier and a wireless access standard of the subscriber;
instructions for determining service processing resources required by the two or more wireless access standards according to a demand for the two or more wireless access standards based upon the respective traffic model data for the two or more wireless access standards;
instructions for adjusting the service processing resources of the two or more wireless access standards based on the determined service processing resources required by the two or more wireless access standards; and
instructions for loading service processing resource software corresponding to the adjusted service processing resources for the two or more wireless access standards,
wherein the traffic model data comprises one or any combination of number of subscribers, busy hour call attempts, erlang, or a call success/failure rate, and traffic model data for a repeated subscriber is not acquired according to the storing of the mapping relationship between the subscriber identifier and the wireless access standard of the subscriber,
wherein the traffic model data of the two or more wireless access standards of the multi-mode base station system is periodically acquired by:
acquiring the subscriber identifier of the subscriber;
when the multi-mode base station system does not store the subscriber identifier, storing the identifier of the subscriber and the wireless access standard of the subscriber, and increasing number of subscribers under the wireless access standard corresponding to the subscriber by one; and
when the multi-mode base station system stores the subscriber identifier, comparing a stored wireless access standard of the subscriber with a current wireless access standard of the subscriber, if the compared wireless access standards are not consistent with each other, decreasing number of subscribers under the wireless access standard corresponding to the subscriber by one, and increasing number of subscribers under the current wireless access standard corresponding to the subscriber by one, and updating the stored wireless access standard of the subscriber with the current access standard of the subscriber.

14. The computer program product according to claim 13, wherein the program code further comprising:
instructions for computing ratio of the service processing resources required by the two or more wireless access standards based on the traffic model data; and
instructions for determining the service processing resources required by the two or more wireless access standards according to the ratio.

15. The computer program product according to claim 13, wherein the program code further comprising:
instructions for computing step size for adjusting the service processing resources of the two or more wireless access standards according to the traffic model data; and
instructions for determining the service processing resources required by the two or more wireless access standards based on the step size for adjusting the service processing resources.

* * * * *